US 6,559,975 B1

(12) United States Patent
Tolmer et al.

(10) Patent No.: US 6,559,975 B1
(45) Date of Patent: May 6, 2003

(54) FULL-COLOR TO A SPOT-COLOR IMAGE CONVERTER

(75) Inventors: Justin G. Tolmer, Redmond, WA (US); Edward H. Ringness, Seattle, WA (US); Paul C. Elliott, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/333,735

(22) Filed: Jun. 15, 1999

(51) Int. Cl.[7] .................................................. H04N 1/40
(52) U.S. Cl. ........................ 358/1.9; 358/500; 358/504; 358/515; 358/518; 382/270; 382/164; 382/167
(58) Field of Search ....................... 358/1.9, 500, 504, 358/518, 1.18, 1.15, 302, 296, 527, 515; 382/270, 164, 167

(56) References Cited

U.S. PATENT DOCUMENTS

| 4,631,579 | A | * | 12/1986 | Hoffrichter et al. | ......... 358/515 |
| 4,670,780 | A | * | 6/1987 | McManus et al. | .......... 358/518 |
| 4,903,048 | A | * | 2/1990 | Harrington | .................. 347/115 |
| 4,908,779 | A | * | 3/1990 | Iwata | .......................... 345/593 |
| 5,146,346 | A | * | 9/1992 | Knoll | .......................... 382/167 |
| 5,370,976 | A | * | 12/1994 | Williamson et al. | ........ 430/358 |
| 5,508,827 | A | * | 4/1996 | Po-Chieh | .................... 358/518 |
| 5,611,030 | A | * | 3/1997 | Stokes | ......................... 345/590 |
| 5,740,333 | A | * | 4/1998 | Yoh et al. | ..................... 358/1.9 |
| 5,822,503 | A | * | 10/1998 | Gass et al. | ................... 358/1.9 |
| 5,936,749 | A | * | 8/1999 | Ikeda | .......................... 358/515 |
| 5,982,924 | A | * | 11/1999 | Power et al. | ............... 382/162 |
| 5,995,653 | A | * | 11/1999 | Reed et al. | ................. 382/162 |
| 6,072,589 | A | * | 6/2000 | Rozzi | .......................... 358/1.9 |
| 6,198,552 | B1 | * | 3/2001 | Nagae | ......................... 358/518 |
| 6,226,103 | B1 | * | 5/2001 | Klassen et al. | .............. 358/1.9 |

OTHER PUBLICATIONS

Microsoft, Microsoft Office Publisher 2000, 2000, http://office.microsoft.com/assistance/2000/pubpotprocess.*
Eric Stollnitz, Victor Ostromoukhov, David Salesin; Reproducing Color Images Using Custom Inks. University of Washington, p 1–8.*
Kansei Iwata and Gabriel Marcu, Computer Simulation of Printed Colors on Textile Materials, In color Hard Copy and Graphics Arts III, vol. 2171 of Proceedings of the SPIE, pp. 228–238, 1994.*
Tony Johnson, A Complete Colour Reproction Model for Graphic Arts, In the Proceddings of the Technical Association of the Graphic Arts, pp. 1061–1076, 1996.*

* cited by examiner

Primary Examiner—Edward Coles
Assistant Examiner—Tia Carter
(74) Attorney, Agent, or Firm—King & Spalding LLP (57) ABSTRACT

A method for transforming an image, containing an arbitrary number of colors from a full color process printing mode to a spot color printing mode while preserving the user's intended color usage as much as possible. The method is contained in a utility and referred to as "Spot Color Transformation" (SCT). The SCT utility provides a user the ability to transform an image generated by a computer program module, such as a desktop publishing computer program module, from a full color mode into a spot color mode. The SCT utility operates on an object-by-object basis to map objects within an image to one of several partitions: a black partition and a color partition. The SCT utility maps each object that has an associated color that is substantially black or a tint of black to the black partition. Next, the SCT utility converts the colors of unmapped objects to a tint of the spot color based on the luminance value of the particular color relative to the lowest luminance value found in the image. Finally each converted object and its corresponding tint of the spot color are mapped to the spot color partition. The partitions are then used to print copies of the image.

22 Claims, 8 Drawing Sheets

FULL-COLOR TO A SPOT-COLOR IMAGE CONVERTER

TECHNICAL FIELD

This invention relates to the field of desktop publishing and, more particularly, relates to a software utility for converting full-color images to spot-color images including creating partitions that may be used to create printing plates and screens for offset and other types of printing.

BACKGROUND OF THE INVENTION

Offset printing is a form of lithography in which ink is transferred from a plate containing the image to be printed on paper. The simplest and least expensive form of offset printing is black-and-white printing. The process begins by making a halftone partition (i.e., negative) of the original object in various tints of black. A halftone partition is formed by printing dots of ink of various sizes within a predefined area to achieve various tints of black. Next, a printing plate is made from the partition, usually by contact etching on a sensitized plate. Finally, the plate containing the image is placed in an offset printing press to produce a black-and-white reproduction of the image. A similar process is used to create screens for screen printing and other types of partitions for other printing processes.

Producing full-color reproductions of an image using offset and other printing processes is more complex and costly than simple black-and-white reproductions. To make full-color reproductions, a process known as color separation is employed. For example, color separation for an offset printing process consists of creating four separate printing plates, each plate for printing one of the four process colors, cyan, magenta, yellow, and black (CMYK). All colors within the image are then printed by blending layers of various sizes of halftone dots printed in these process colors to create the full-color image. Each plate is etched from a single-color negative known as a partition. To create the partitions, the image is divided into a partition for each of the four process colors by a process known as color separation. Color separation is typically performed by passing the image through a series of color filters and then through a screen to create the halftone partitions. Each halftone partition is then used to etch a positive image on an engraving plate so that each printing plate contains the halftone dots for printing only one process color.

Spot-color printing is an alternative printing process that can produce spot colors of higher quality and may often be significantly less expensive than full-color printing. In spot-color printing, one or more colored inks, other than the four process colors, are used to print the image. For example, in a COCA-COLA advertisement, it may be particularly important to print the COCO-COLA logo with the precise vibrant red that customers have come to associate with that product. Therefore, when printing the advertisement, it may be advantageous to print the logo using a red spot color. In addition, in some cases, the remainder of the image may be printed in tints of black, which requires two printing plates (i.e., spot-red and black) instead of the four plates required for full-color printing. Although this printing technique may reduce the number of colors, it can be less expensive and still meets the needs of users in certain circumstances. In general, spot-color printing is often an attractive alternative to increase the quality of a particular color in the printed images, and in some cases to reduce the cost of the printed images.

Typically, many users of desktop publishing computer programs design their publications in full-color without considering which printing process will be used to print the publication. When the time arrives to print the publication, however, the user may prefer spot-color printing over full-color printing for the reasons mentioned above. Unfortunately, at this stage of the printing cycle, it is often too late for the user to conveniently change the printing process. This is because in many conventional desktop publishing programs, the user typically has to recreate the publication from scratch in a spot-color process mode in order to create the required spot-color partitions. This can be a time consuming, inefficient, and frustrating process. Thus, there is a need for desktop publishing program that more easily convert images from full-color to spot-color for creating partitions that may be used to create printing plates and screens for offset and other types of printing.

Some desktop publishing programs have attempted to solve this problem by converting full-color to spot-color images in response to a user command. However, these programs employ an overly simplistic color conversion technique. Specifically, these programs identify objects in the image in which the associated colors are exactly the same as the spot color (i.e., color values are identical) or explicit tints of the spot color, and map those objects to a spot color partition. The program then maps all of the remaining unmapped elements in the image to the black partition. That is, only the exact spot-color, and explicit tints of the spot-color, are mapped to the spot-color partition. All remaining colors are mapped to the black partition (i.e., are printed as shades of gray). Many users find this color conversion technique inadequate because it maps the vast majority of the objects (i.e., all objects except those having the precise spot color in the original image, or an explicit tint of the spot-color) to the black partition, which is not what the user usually intends.

Another conversion technique allows the user to select more than one spot color. For example, the user could select two spot colors in addition to black. However, this conversion technique still maps only those objects that are exact matches of the two selected spot colors to a corresponding spot color partition, and maps the remaining objects, including those are tints of the spot colors, to the black partition. As a result, tints of the spot colors are still mapped to the black partition, and the vast majority of objects (i.e., all objects except those having the precise two spot colors in the original image) are still mapped to the black partition. Again, this is not what the user usually intends.

Still another conversion technique allows the user to select two spot colors to create an "extended duotone" image. This conversion technique combines the two spot-colors to represent the colors of the original image. As a result, most of the objects are printed as halftone blends of the two spot colors. That is, all of the objects that are not a tint of one of the spot colors in the original image are printed as halftone blends of the two spot colors. Many user find duotone printing unacceptable because blending the spot-color inks together reduces the visual impact of the individual spot-color inks. In other words, duotone printing diminishes the distinctiveness of the spot-color inks, which is often one of the important objectives of spot color printing. Instead, many users prefer to enhance the distinctiveness of the spot-color inks by avoiding the practice of blending the spot-color inks together.

Thus, there is a general need in the art for a more convenient and efficient method for converting images from full-color to spot-color. There is a further need for a method for converting images from full-color to spot-color without mapping tints of the spot to the black partition, without mapping most of the object to the black partition, and without blending the spot-color inks.

SUMMARY OF THE INVENTION

The present invention meets the above-described needs in a software utility for transforming an image from full-color to spot-color without mapping tints of the spot color to the black partition, and without blending the spot-color inks. Specifically, for a two-color print, all the tints of black are mapped to a black partition, and all remaining colors are mapped to a spot-color partition using a luminance matching technique. For a three color print, all tints of black are mapped to a black partition, all tints of a first spot color are mapped to a first spot color partition, and all remaining colors are mapped to a spot color partition using a luminance matching technique. This process does not diminish the distinctiveness of the spot-color process by blending spot color together. This process also maps the vast majority of the objects (i.e., all objects that are not a tint of black in the original image) to a spot-color partition.

Generally described, for a two-color print, a Spot Color Transformation (SCT) receives an image that contains a plurality of objects. Each object has an associated color that is defined by a set of color values. The SCT utility first maps each object that has an associated color that is substantially black or a tint of black to a black partition. The SCT utility then maps all remaining unmapped objects to a spot color partition using a luminance matching technique.

More specifically, the SCT utility calculates the luminance values of each unmapped object in the image. Luminance, which generally connotes the perceived brightness of the color, may be computed as a weighted average of the RGB color values for the color. Next, the SCT utility transforms the colors of the remaining unmapped objects to a percent tint of the spot color. The percent tint is based on the luminance value of the particular color relative to the lowest luminance value found in the image. That is, the SCT utility assigns a maximum percent tint of the spot color to the color in the original image having the lowest luminance value. The SCT utility then computes the percent tint for each remaining color as the quotient of the difference between the luminance value of the particular color and a maximum luminance value, and the difference between the lowest luminance value and the maximum luminance value. The SCT utility then maps each transformed object to a spot color partition, which may be used to create printing plates, screens, or other types of image positives for making copies of the original image.

The SCT utility may also produce three partitions for printing in two spot colors and black. For this type of three-color separation, the SCT utility maps all tints of black to a black partition, all tints of a first spot color to a first spot color partition, and all remaining colors to a spot color partition using the luminance matching technique described above.

The SCT utility may operate on images consisting of RGB values, CMYK values, or HSY values. Stated differently, the SCT utility may operate on images defined by color values in the color-domain consisting of primary (additive) color values or process (subtractive) color values, and may also operate on images defined by color values in the hue domain. For images defined by color values in the color-domain, the SCT utility calculates a luminance value for each unmapped object as a weighted sum of the color values for the object.

The invention also includes a method for making copies using the methods described above for the SCT utility and also creating copies based on the partitions produced by the SCT utility. For example, printing plates may be created from the partitions and used to print copies of the image on an offset printing press. Similarly, silk screens may be created from the partitions and used to print copies of the image on a screen printing machine. Other types of partitions and printing positives may also be created and used to make copies in accordance with the present invention. In sum, the invention includes an apparatus operable for carrying out the methods described above, and a computer-readable storage device storing a set of computer-executable instructions for performing those methods.

That the invention improves over the drawbacks of spot color transformation systems and accomplishes the advantages described above will become apparent from the following detailed description of the exemplary embodiments and the appended drawings and claims.

DETAILED DESCRIPTION OF EMBODIMENTS OF THE INVENTION

The present invention may be embodied in a software utility, which is referred to as the "Spot Color Transformation" (SCT) utility. An embodiment of this utility is incorporated into Microsoft's PUBLISHER 2000 software system. The SCT utility converts full-color images to spot-color images by first mapping all the objects that are a tint of black to the black partition. The SCT utility then maps each unmapped color to the spot color partition as an appropriate tint of the spot color. This preserves the distinctiveness of the different colors of the original image and while preserving, as much as possible, the user's intended color scheme.

The term software "utility" typically denotes a software function, routine, or dynamic link library (DLL) that is configured as an independent object or module accessible by other software modules through a predefined set of interfaces. However, a "utility" within the meaning of this specification may also be incorporated into a computer operating system or application program, such as a desktop publishing application program. The invention therefore encompass any type of software module or system that performs the methods of the SCT utility described in this specification, and is not limited to a particular object configuration, such as a dynamic link library (DLL). In addition, although the present invention is described in the context of a desktop publishing program, those skilled in the art will appreciate that the invention is applicable to other programs that display or allow a user to print images, such as word processing programs, presentation programs, drawing programs, computer aided design programs, and the like.

The SCT utility provides a user the ability to transform an image generated by a computer program module, such as a desktop publishing computer program module, from a full color mode into a spot color mode. The SCT utility typically operates on an object-by-object basis to map objects within an image to one of several partitions. The term "object" when used to describe a portion of an image or publication typically means a distinct multi-pixel entity having an associated color, such as a frame, picture, block of text, or the like. However, an image "object" within the meaning of this specification includes individual pixels as well as multi-pixel configurations. That is, the SCT utility typically operates on multi-pixel objects to increase processing speed, but the methods of the SCT utility are equally applicable to individual pixels and could be performed on a pixel-by-pixel basis.

The SCT utility first receives an image, which typically includes a number of discrete objects. Each object is associated with a color represented by a set of values in a color domain, usually the primary RGB color values. However, the SCT utility may also operate on images defined by other types of color values, such the process color values cyan, magenta, yellow, and black (CYMK), as well as images defined in the hue domain by color values representing hue, luminance and saturation (HSY). Those skilled in the art will appreciate that each type of color value may be transformed to the other types of color values. That is, a given RGB color value can be linearly transformed to an HSY color value, and can also be transformed to a CMYK color value based on the properties of the particular process inks. For purposes of this application, the methods of the SCT utility are described with reference to RGB color values. Nevertheless, those skilled in the art will appreciate that the SCT utility may operate on images defined with the other types of color values.

After the SCT utility receives an image, the utility identifies a first subset of objects whose associated color is either substantially black or a tint of black. An object's associated color is considered to be a tint of black if the value of each of its color components are the same. In other words, the SCT utility considers an object to be black when the value of the red, green, and blue color components are all at the minimum value (i.e., R=0, G=0, and B=0). Similarly, colors are considered a tint of black when each component of the RGB values are the same value (i.e., R=B=G=30). The SCT utility then maps each object of the first subset, which is identified as a tint of black to the black partition.

Next, the SCT utility transforms the remaining colors of the unmapped objects to a percent tint of the spot color. The transformation is based on the calculated luminance values of each object. The SCT utility calculates the luminance values using the values of the RGB components of each unmapped object. The SCT utility computes the luminance of each object using the formula:

$$\text{Luminance}_i = \alpha \cdot R_i + \beta \cdot G_i + \gamma \cdot B_i$$

where $\text{Luminance}_i$ is the luminance value of the $i^{th}$ color, $\alpha$, $\beta$, and $\gamma$ are the National Tests and Standards Bureau (NTSB) coefficients for calculating luminance values using RGB values, and $R_i$ is the red component of the $i^{th}$ color, $B_i$, is the blue component of the $i^{th}$ color, and $G_i$ is the green component of the $i^{th}$ color. In the present embodiment, the NTSB values of the coefficients, $\alpha$, $\beta$, and $\gamma$ are 0.30, 0.59, and 0.11, respectively. However, those skilled in the art will appreciate that other values of the coefficients may be used to calculate the luminance values of each color without changing the scope of the invention. Because each value of each RGB component is between 0 and 255, the value of each calculated luminance is also between 0 and 255. However, luminance is a measurement of the intensity, or the perceived brightness of the color. Therefore, the values of luminance are different than the RGB values for color. For example, a color having a luminance value of 0 is considered dark, or having no perceived brightness. On the other hand, a color having a computed luminance value of 255 is considered completely bright, or having the highest perceived brightness. Every color will have a luminance value lying between these two extremes. It is evident from the above formula that two or more different colors may have the same luminance value, that is the same perceived brightness. For example, a predominantly red color having RGB values R=200, G=150, and B=100 has the same luminance value of a predominantly blue color with RGB values R=7, G=200, and B=250.

After the luminance values of unmapped objects in the publication are calculated, the SCT utility compares the resultant luminance values to every other luminance value and ranks them. Once the luminance values are ranked, the SCT utility cycles through the ranked luminance values and converts each original color associated with the luminance values to a tint of a selected spot color. The SCT utility transforms the color with the lowest luminance value to the "true" spot color. That is, the SCT utility converts the color with the lowest luminance into a spot color with a tint equal to one hundred percent (100%) of the spot color. The unmapped original colors are converted to a percent tint of the spot color, which directly corresponds to the ranking of the associated luminance values. For example, spot color percent tint may be calculated from the luminance values by a linear transformation using the formula:

$$\% \text{ Tint} = [(\text{Luminance}_{max} - \text{Luminance}_{Object})/(\text{Luminance}_{max} - \text{Luminance}_{Min})] * 100$$

where $\text{Luminance}_{object}$ is the luminance value of the object being transformed and $\text{Luminance}_{min}$ is the lowest luminance value of an object in the image and $\text{Luminance}_{max}$ is the maximum luminance value for the particular color domain. The maximum luminance value is calculated by adding one to the highest luminance value for the particular color domain. For example, in the primary color domain using RGB values, the highest luminance value is 255. Therefore, the maximum luminance value would be 256. Adding one to the highest luminance value ensures that a division by zero error will not occur whenever the image contains only white pixels.

Next, the SCT utility maps each unmapped object to the spot color partition as a percent tint of the spot color. Finally, after the SCT utility maps each object to either the black partition or the spot color partition, the SCT utility may print the partitions to reproduce the image. The partitions may be used to produce a spot-color image in an offset printing press, or some other printing method. For example, the partitions may be used to create printing plates and screens for offset and other types of printing. To illustrate, the partitions may be used to create screen for use in producing silk screen, or the partitions may be used in an inkjet printer or color laser jet printer to produce images which require the distinctiveness of the spot-color inks by printing only tints of the spot color with the spot color ink, and printing all other colors as tints of black.

Furthermore, the SCT utility may transmit the partitions over the Internet, or conventional phone lines, or through free-space to an off-site location, such as a remote user, a remote computer, a remote printer, an offset printer, or an engraver to produce a set of spot-color printing plates.

In another embodiment, the user may elect to choose more than one spot color to print their publication. For example, the user may choose to print using black and two additional spot colors. For purposes of this discussion, the spot color printing mode containing black plus two additional spot colors is discussed although those skilled in the art will appreciated that other spot color printing modes may be used which incorporate different numbers of additional spot colors.

When the user select black plus two additional spot colors, the SCT utility divides the objects of the publication into three partitions. The first partition consists of those objects that are either tints of black. This is identical to the black plus one spot color case described above. However, for the second partition, the SCT utility maps every object that is an exact match or an explicit tint of the first spot color to the second partition. The utility does not perform any transformations on the object in the second partition because they are already defined in terms of the spot color plate's color, as the user wants them to appear.

The SCT utility determines whether an image color is an explicit tint of the selected second spot color by first calculating a ratio of each color component in the image color. If the ratios of each color component are equal, then the image color is considered is an explicit tint of the second spot color. The SCT utility determines the ratios by dividing the difference of the saturation color value and the value of each RGB component of the image color by the difference of the saturation color value and the value of each RGB color component of the second spot color. For example, if the saturation value is set at 255, the ratios may be calculated using the following formulas:

$$\frac{255-R_i}{255-R_{SC}}, \frac{255-G_i}{255-G_{SC}}, \frac{255-B_i}{255-B_{SC}}$$

where $R_i$, $G_i$, and $B_i$ are the red, green and blue components of the color palette color, respectively and $R_{SC}$, $G_{SC}$, and $B_{SC}$ are the red, green, and blue components of the second spot color, respectively. The SCT utility recognizes the image color as being an explicit tint of the second spot color, when all three ratios are equal.

Once all of the colors, which are an exact match and an explicit tint of the second spot color are identified, the SCT utility maps their associated objects to a first spot color partition. The remaining unmapped objects are mapped to a second spot color partition. Each element of the third partition is converted to a percent tint of the second spot color using the method described above. Finally, after the SCT utility maps each object to either the black partition or one of the spot color partitions, the SCT utility may print the partitions to reproduce the image.

Referring to an object as being "substantially" a particular color or referring to an object as being "substantially the same as" a particular color means that the color values associated with the object are exactly the same color values as the particular color or are within a predefined range about the color values as the particular color. For example, the color values $R_a$, $G_a$, $B_a$ may be considered to be substantially the same as the color values $R_b$, $G_b$, $B_b$ if $R_a$, is within 96% of $R_b$, $G_a$, is within 96% of $G_b$, and $B_a$, is within 96% of $B_b$. However, the specific range of color values that are considered to be "substantially the same" and the specific formula for comparing the color values are design parameters that may be varied by a particular user or software designer.

In addition, color partitions created by the SCT utility may be used to create printing plates, screens, or other types of image positives for making copies of the original image. For example, the partitions may be used to produce printing plates, which may be used to print copies of the image on an offset printing press. Alternatively, the partitions may be used to produce silk screens, which may be used to print copies of the image on a screen printing press. Those skilled in the art will appreciate that these or similar partitions may also be applied to other printing methods, such as ink jet, electrostatic toner, and so forth. In addition, the partitions may also be used in electronic form for storage or transmission for display or printing at remote locations, for example using the Internet or another suitable type of computer network.

Exemplary Operating Environment

Figure 1:
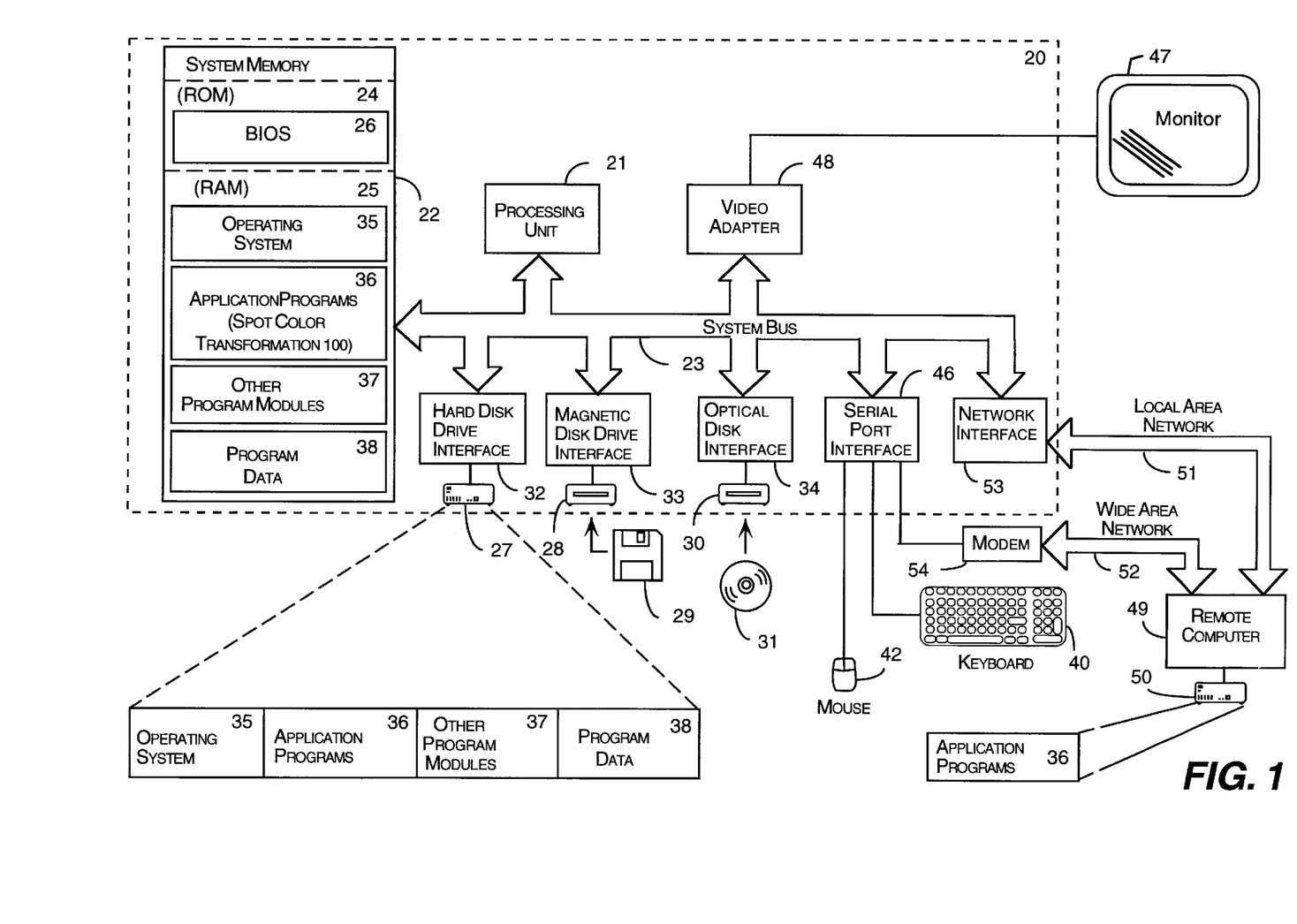
FIG. 1 is a block diagram of a personal computer that provides the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention; may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, which contain the SCT utility 100, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Embodiments of the Invention

Figure 2:
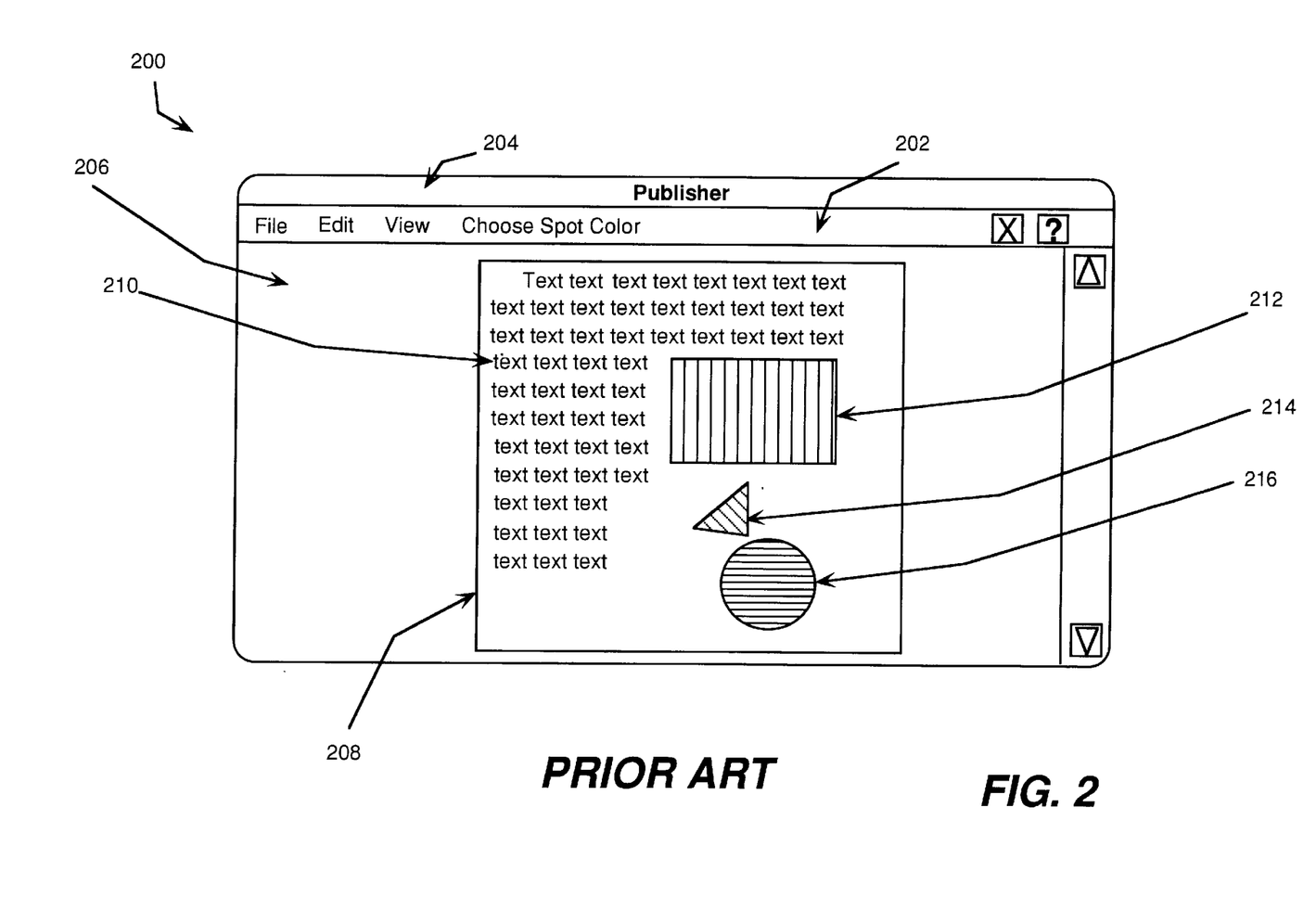
FIG. 2 is a prior art screen display illustrating a typical display of a desktop publishing program module.

FIG. 2 is an illustration of the window 200 showing a typical prior art screen display in Microsoft's PUBLISHER desktop publishing program. A window 200 includes a drop-down menu bar 202 and a title bar 204. The contents of the desktop publishing program are viewed in the viewing area 206, which contains a image 208. The image contains printable objects, such text 210 and graphical elements 212, 214, and 216.

In the illustration, the graphical elements 212, 214, and 216 each have different visual attributes. For example, one graphical element is a rectangle with a red fill color 212. Another graphical element is a triangle with a green fill color 214. A third graphical element is a circle with a blue fill color 216. In addition to the graphical elements, the image 208 contains text 210, which appear in normal font attributes. Normal font attributes indicates that all text appear in black, Times 12 point font unless otherwise indicated.

Figure 3:
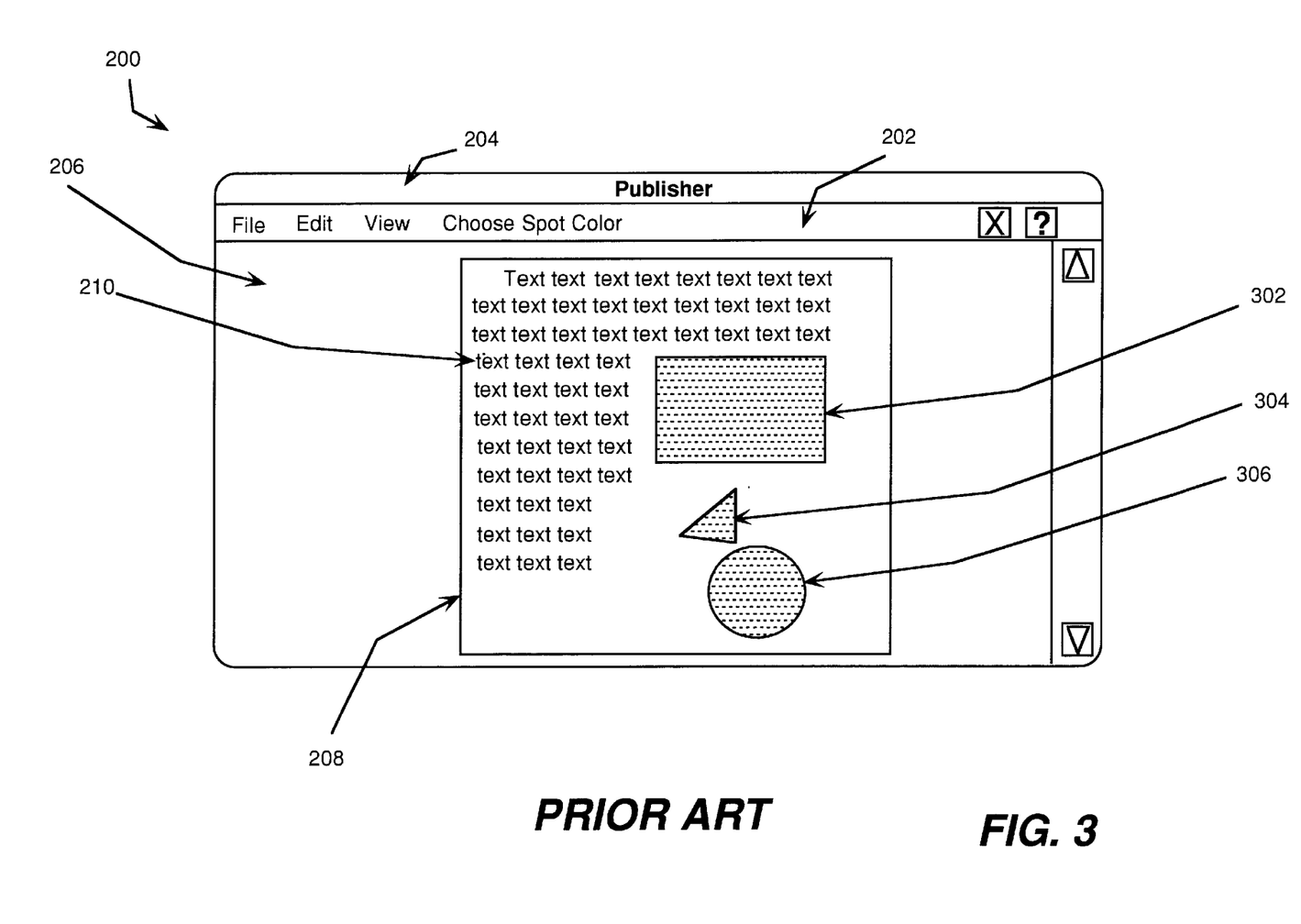
FIG. 3 is a screen display illustrating a prior art technique for displaying a selected publication in black-only spot color printing mode in a desktop publishing program module.

FIG. 3 is an illustration of a typical prior art screen display in Microsoft's PUBLISHER desktop publishing program illustrating how the image 208 would appear using black only spot color printing mode. Because the black-only spot color printing mode only prints in shades of black, each printable object, such as the text 210 and each graphical element 212, 214, and 216 have fill colors that are tints of black. The percent of tint of each element is such that the luminance of each element in relation to each other remains the same as the luminance of each element in full-color printing mode of FIG. 2.

Figure 4:
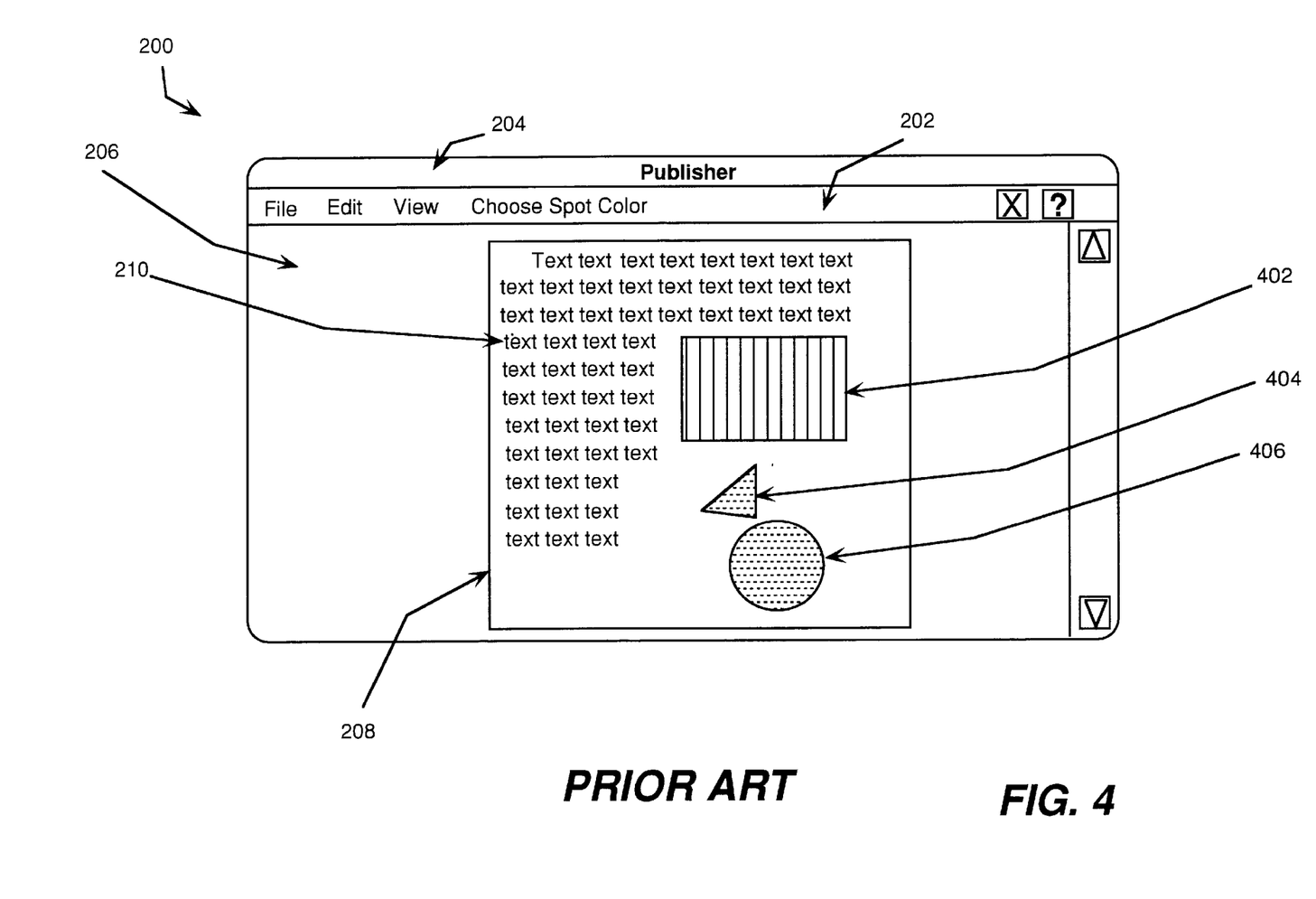
FIG. 4 is a prior art screen display illustrating a prior art technique for displaying a selected publication in a black plus one color spot color printing mode in a desktop publishing program module.

FIG. 4 is an illustration of the window 200 showing a prior art method for displaying the image 208 in black plus one spot color printing mode. In the illustration, the spot color is set to red. Only those printable elements with a red color will be mapped to the spot color partition. Because the rectangular graphical element 212 originally had a red fill color (FIG. 2) it is mapped to the spot color partition. Therefore, the rectangular graphical element still appears with a red fill color in the black plus one spot color-printing mode. The unmapped objects (i.e., the text 210, the triangle object 214, and the circle 216) are mapped to the black partition as tints of black. Thus, the both the triangle 214 and the circle 216 have a fill color which is a tint of black.

Figure 5:
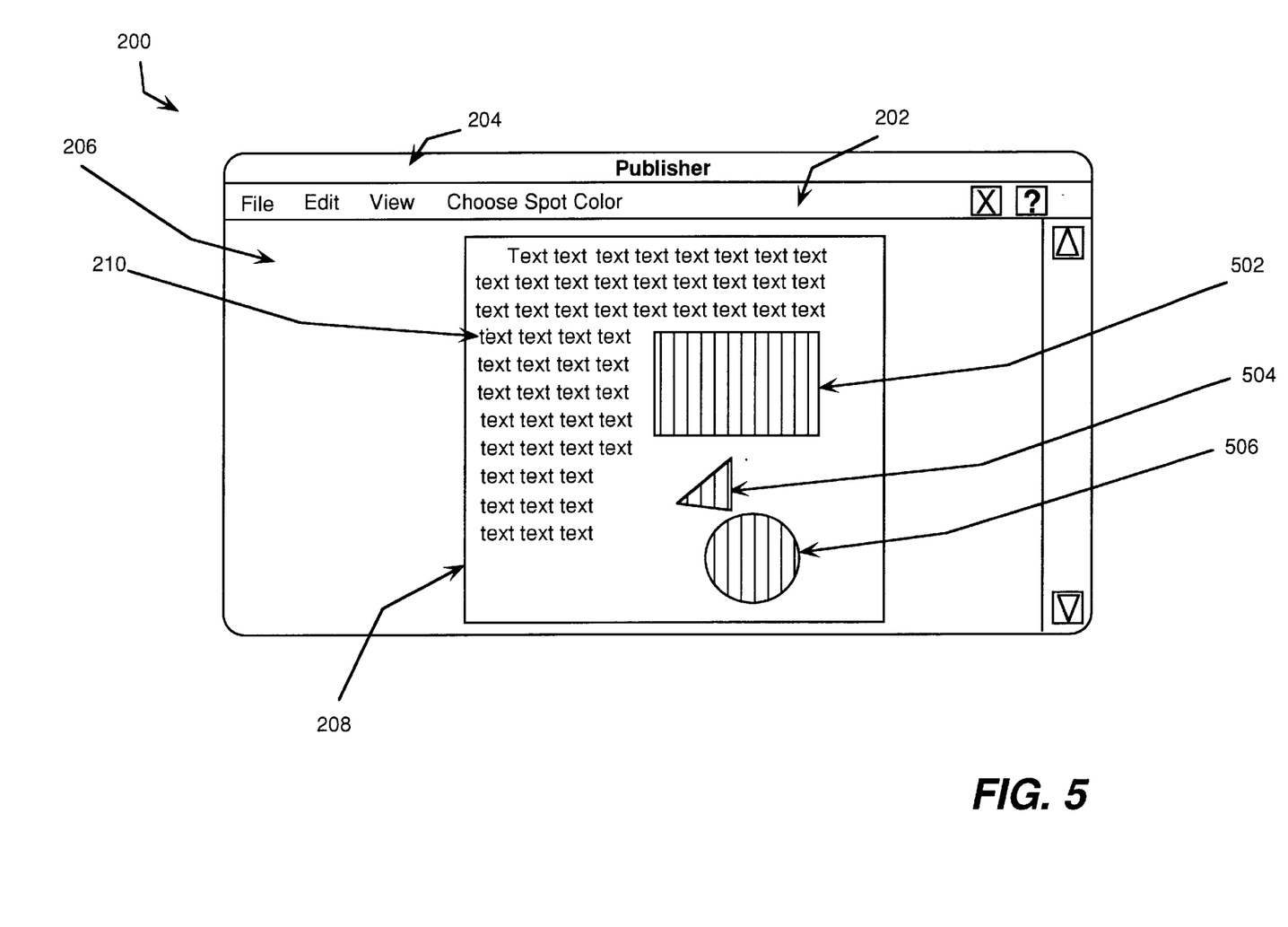
FIG. 5 is a screen display illustrating a Spot Color Transformation utility for displaying a selected publication in black plus one-color spot color printing mode in a desktop publishing program module.

FIG. 5 is an illustration of the window 200 displaying the image 208 using the Spot Color Transformation utility in black plus one spot color mode. In the present illustration, the spot color is set to red. As before, the text 210 is mapped to the black partition because all printable elements that are either black or a tint of black are mapped to the black partition.

The rectangle 212, the triangle 214 and the circle 216 all appear in tints of the spot color, red. The percent tint of red for each object is directly proportional to the luminance value of the object displayed in their original colors (FIG. 2). If each graphical element has a different luminance value, the fill color will be a different tint of the spot color, which is directly proportional to the luminance value of each object.

Figure 6:
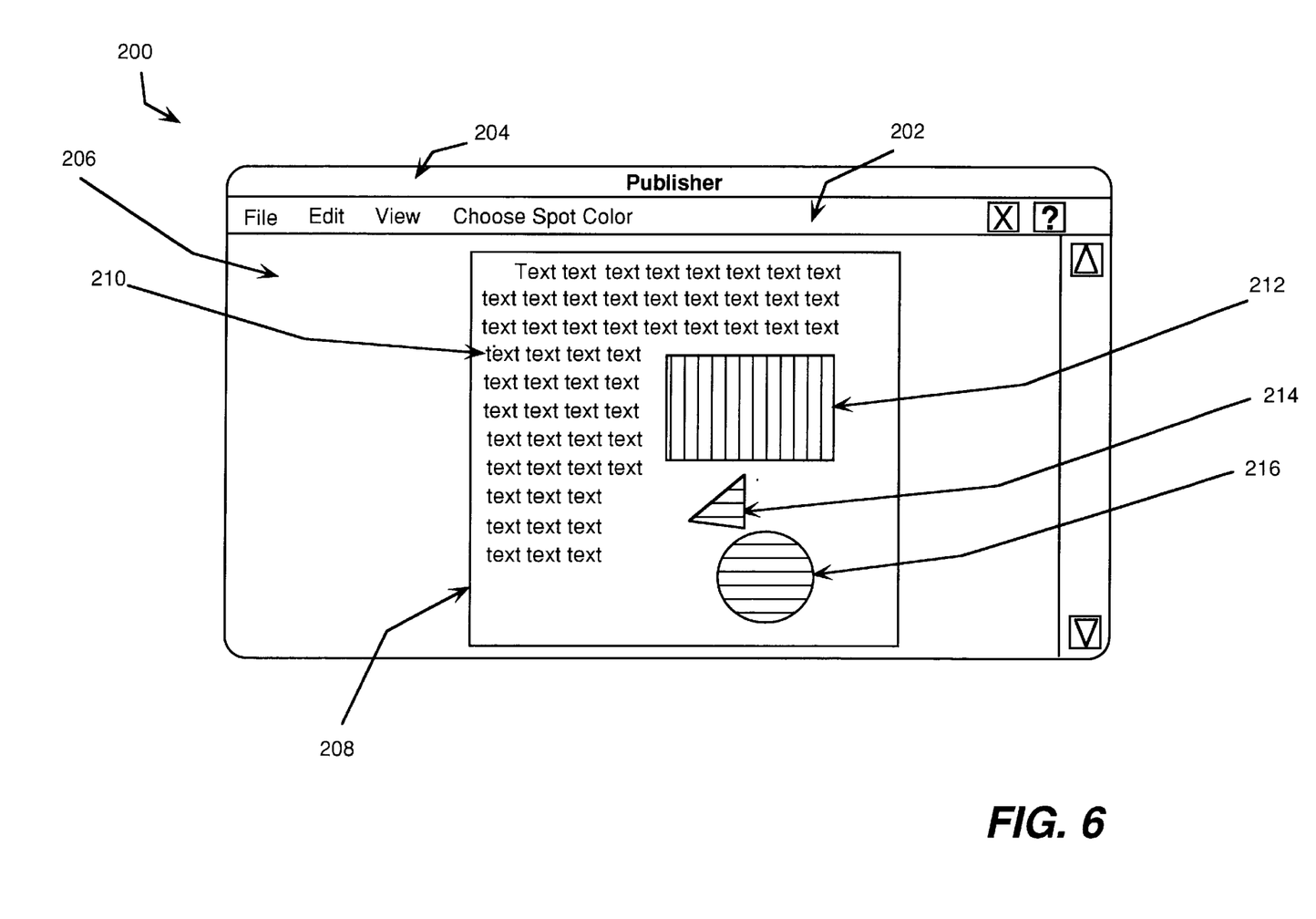
FIG. 6 is a screen display illustrating a Spot Color Transformation utility for displaying a selected publication in black plus two-color spot color printing mode in a desktop publishing program module.

FIG. 6 is an illustration of the window 200 displaying the image 208 using the Spot Color Transformation utility in black plus two spot color mode. In the figure, the first spot color is set to red and the second spot color is set to blue. As before, the text 210 is mapped to the black partition because all printable elements that are either black or a tint of black are mapped to the black partition.

Because the rectangle's 212 fill color is an exact match of the first spot color, it is mapped to the red spot color partition. Similarly, the circle 216 is mapped to the blue spot color partition because its fill color is an exact match of the blue spot color. Because the triangle 214 is neither an exact match or an explicit tint of either spot color, it is mapped to the second, or blue spot color partition as a tint of blue.

Figure 7:
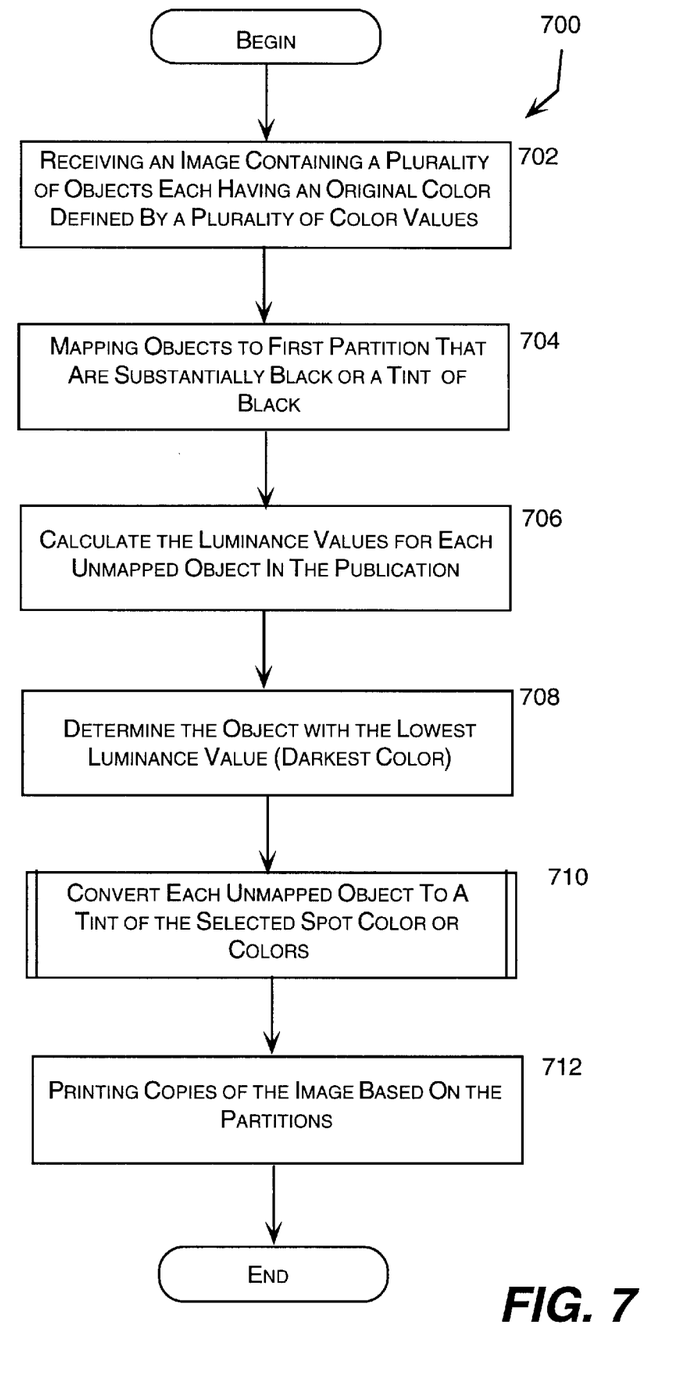
FIG. 7 is a logic flow diagram illustrating an exemplary technique for applying Spot Color Transformation utility to a publication in a desktop publication program module.

FIG. 7 is a logic flow diagram illustrating routine 700 for applying the operation of the Spot Color Transformation utility 100 (FIG. 1) to a image 208 generated by a desktop publishing computer program. Those skilled in the art will appreciate that the logic flow diagram of FIG. 7 is executed by the processing unit 21 (FIG. 1) in response to instructions that have been incorporated into the Spot Color Transformation utility 100.

The routine 700 begins at step 702, in which the user selects either one spot color mode or two spot color mode to use in an offset printing process. The term spot color mode is meant to include a black partition in addition to the spot color(s) partition(s). The color(s) used for the spot color(s) are typically set as default colors. However, the user may override the default color selection and choose color(s) from a image, which contains every color capable of being displayed on the display device.

Step 702 is followed by step 704, in which the SCT utility maps each color separated object that has a corresponding image color of black or a tint of black to a first partition.

Step 704 is followed by step 706, in which the SCT utility 100 calculates the luminance values for each unmapped object within the image 208. Printable objects may include text, photographs, graphical images, and clip art. The SCT utility 100 determines the luminance value of each color for each printable object by multiplying each RGB component by a separate weighting factor. The resulting products are summed to yield an associated luminance value. For example, the luminance of each color may be calculated using the formula:

$$\text{Luminance}_I = \alpha * R_i + \beta * G_i + \gamma * B_I$$

where Luminance$_I$ is the luminance value of the $i^{th}$ color, $\alpha$, $\beta$, and $\gamma$ are the National Tests and Standards Bureau (NTSB) coefficients for calculating luminance values using RGB values, and R$_i$ is the red component of the $i^{th}$ color, B$_i$, is the blue component of the $i^{th}$ color, and G$_i$ is the green component of the $i^{th}$ color. In the present embodiment, the NTSB coefficients, $\alpha$, $\beta$, and $\gamma$ are 0.30, 0.59, and 0.11, respectively.

Step 706 is followed by step 708, in which the SCT utility 100 determines the lowest calculated luminance value of the unmapped objects in the image 208. The lowest calculated luminance value corresponds to the color with the lowest perceived brightness. In the present embodiment, the SCT utility 100 ranks the calculated luminance value for each color within the image 208. In the present embodiment, the luminance values are ranked in descending order. However, those skilled in the art will appreciate that other ranking systems, such as ascending may be employed to order the luminance values without changing the scope of the invention.

Once the luminance values are ranked, the SCT utility 100 makes a second pass through the image and converts the unmapped objects to a tint of the selected spot color(s) in step 710. The tint percentage is calculated by determining where the luminance values of each color falls on a scale where the luminance of the darkest color found in the first pass is a one hundred percent (100%) tint and white is a zero percent (0%) tint. The converted objects are then mapped a second partition, which contains only the spot color and tints of the spot color. Step 710 is followed by step 712, in which the partitions are used to print copies of the image.

Figure 8:
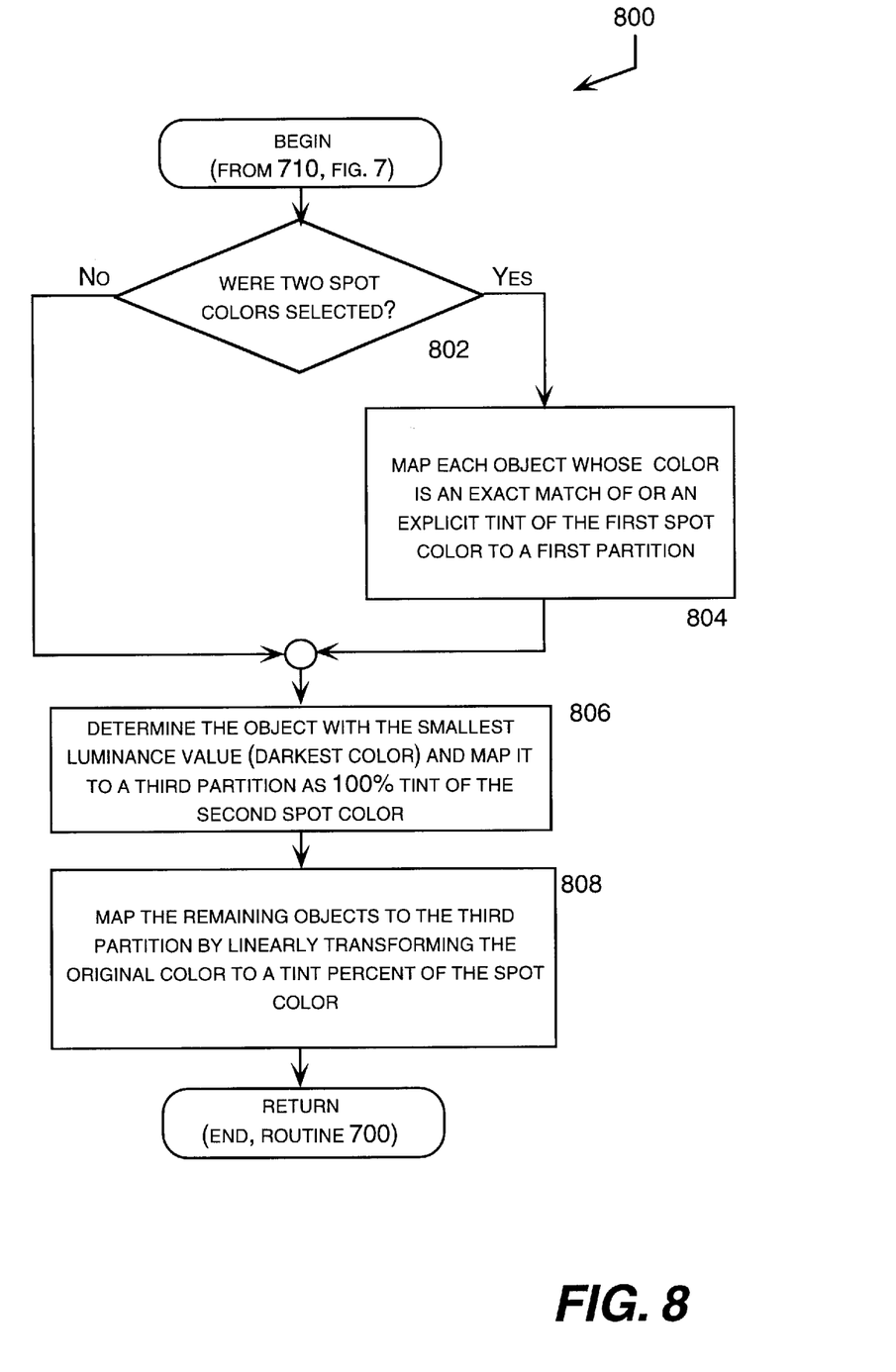
FIG. 8 is a logic flow diagram for converting each image color to a tint of the selected spot color or colors.

FIG. 8 is a logical flow diagram illustrating routine 710 in FIG. 7, which converts each original color in the image 208 to a tint of the spot color(s). The routine 710 begins after step 708 in FIG. 7. At step 802, the SCT utility 100 determines whether the user selected the black plus two spot color mode. If the user selected the black plus two spot color mode, the routine 710 follows the "YES" branch to step 804, in which the SCT utility 100 maps each color whose equivalent image color is an exact match or an explicit tint of the first spot color to a second partition. The SCT utility determines whether an equivalent image color is an exact tint of the selected second spot color by comparing the RGB values of each image color to the RGB values of the selected second spot color. An exact match occurs when each RGB value of the image color matches exactly each RGB value of the second spot color.

The SCT 100 utility determines whether an image color is an explicit tint of the selected second spot color by first calculating a ratio of each color component in the image color. If the ratios of each color component are equal, then the image color is considered is an explicit tint of the second spot color. The SCT utility 100 determines the ratios by dividing the difference of the saturation color value and the value of each RGB component of the image color by the difference of the saturation color value and the value of each RGB color component of the second spot color. As an example, the saturation value may be set to 255. The SCT utility 100 calculates the ratios of the color to the first spot color and for each component and comparing the ratios of the color components to the original color. If the ratio of each component is proportional to the RGB values of the spot color, then the color associated with the object is considered to be an explicit tint of the first spot color. For example, the ratios may be calculated using the following formulas:

$$\frac{255 - R_i}{255 - R_{SC}}, \frac{255 - G_i}{255 - G_{SC}}, \frac{255 - B_i}{255 - B_{SC}}$$

where R$_i$, G$_i$, and B$_i$ are the red, green and blue components of the image color, respectively and R$_{SC}$, G$_{SC}$, and B$_{SC}$ are the red, green, and blue components of the second spot color, respectively. The SCT utility 100 recognizes the image color as being an explicit tint of the second spot color, when all three ratios are equal.

Once all of the objects that are an exact match and an explicit tint of the first spot color are identified, the SCT utility 100 maps them to the first spot color partition. Because each of the objects are defined in terms of the first spot color, the SCT utility does not perform any additional transformations on these colors.

Step 804 is followed by step 806, in which the SCT utility determines the unmapped objects with the smallest luminance value. The SCT utility 100 designates this color as the second "pure" spot color. That is this color is defined as having one hundred percent (100%) tint of the second spot color. The SCT utility 100 maps this object as the one hundred percent (100%) tint of the second spot color to a third partition.

Step 806 is followed by step 808, in which the SCT utility 100 maps the unmapped objects in the image 208 to the third partition. The transformation is accomplished by determining where the previously calculated luminance value associated with the remaining second spot color and the luminance of the lightest color is the 0% tint of the first spot color. For example, the calculated luminance values that were previously ranked are linearly transformed to a percent tint of the first spot color using the formula:

$$\% \text{ Tint} = [(\text{Luminance}_{max} - \text{Luminance}_{Object})/(\text{Luminance}_{max} - \text{Luminance}_{Min})]*100$$

where Luminance$_{Object}$ is the luminance value of the object being transformed and Luminance$_{Min}$ is the lowest luminance value of an object in the image and Luminance$_{max}$ is the maximum luminance value for the particular color domain. The maximum luminance value is calculated by adding one to the highest luminance value for the particular color domain. For example, in the primary color domain using RGB values, the highest luminance value is 255. Therefore, the maximum luminance value would be 256. Next, each color is mapped to the third partition as a tint of the second spot color. Step 808 is followed by the "RETURN" step, in which the routine returns to the "END" step of routine 700 (FIG. 7).

The present invention thus provides a method for transforming a image, containing an arbitrary number of colors from a full color process printing mode to a spot color printing mode while preserving the user's intended color usage as much as possible.

It should be understood that the foregoing pertains only to the preferred embodiments of the present invention, and that numerous changes may be made to the embodiments described herein without departing from the spirit and scope of the invention.

What is claimed is:

1. A method for converting images from a full color mode to a spot color mode comprising the steps of:
   receiving an image comprising a plurality of objects, each object having an original color defined by a plurality of color values:
      identifying a first subset of the objects that are substantially black or a tint of black;
      mapping the first subset of objects to a first partition;
      transforming the colors of the unmapped objects to a percent tint of a spot color based on luminance values associated with the unmapped objects; and
      mapping the transformed objects to a second partition.

2. The method of claim 1, wherein the color values consist essentially of RGB values.

3. The method of claim 1, wherein the color values consist essentially of CMYK values.

4. The method of claim 1, wherein the color values consist essentially of HSY values.

5. The method of claim 2, further comprising the step of calculating a luminance value for each unmapped object as a weighted sum of the color values for the object.

6. The method of claim 3, further comprising the step of calculating a luminance value for each unmapped object as a weighted sum of the color values for the object.

7. The method of claim 1, wherein the step of converting the colors of the unmapped objects to a percent tint of the spot color comprises the steps of:
   assigning a maximum percent tint to the object with a lowest luminance value; and
   for each unmapped object, assigning the percent tint based on the quotient of the difference between the luminance value of the unmapped object and a maximum luminance value, and the difference between the lowest luminance value and the maximum luminance value.

8. The method of claim 1, further comprising the steps of printing copies of the image based on the first and second partitions.

9. The method of claim 1, further comprising the steps of:
   creating printing plates based on the first and second partitions; and
   printing copies of the image using the printing plates.

10. An apparatus operable for carrying out the steps of the method of claim 1.

11. An apparatus operable for carrying out the steps of the method of claim 8.

12. A computer-readable storage device storing a set of computer-executable instructions for performing the method of claim 1.

13. A method for converting images from a full color mode to a spot color mode comprising the steps of:
   receiving an image comprising a plurality of objects, each object having an original color defined by a plurality of color values:
      identifying a first subset of the objects that are substantially black or a tint of black;
      mapping the first subset of objects to a first partition;
      identifying a second subset of the objects that are substantially the same color as a first spot color or a tint of the first spot color;
      mapping the second subset of the objects to a second partition;
      transforming the colors of the unmapped objects to a percent tint of a second spot color based on luminance values associated with the unmapped objects; and
      mapping the transformed objects to a third partition.

14. The method of claim 13, further comprising the step of calculating a luminance value for each unmapped object by calculating a weighted sum of the color values for the object.

15. The computer-readable medium of claim 13, wherein the step of converting the colors of the unmapped objects to a percent tint of the spot color comprises the steps of:
   assigning a maximum percent tint to the object with a lowest luminance value; and
   for each unmapped object, assigning the percent tint based on the quotient of the difference between the luminance value of the unmapped object and a maximum luminance value, and the difference between the lowest luminance value and the maximum luminance value.

16. The method of claim 12, further comprising the steps of printing copies of the image based on the first, second, and third partitions.

17. The method of claim 12, further comprising the steps of:
   creating printing plates based on the first, second, and third partitions; and
   printing copies of the image using the printing plates.

18. An apparatus operable for carrying out the steps of the method of claim 14.

19. An apparatus operable for carrying out the steps of the method of claim 18.

20. A computer-readable storage device storing a set of computer-executable instructions for performing the method of claim 14.

21. A computer-readable medium having computer-executable instructions for performing the steps of:
   receiving an image comprising a plurality of objects, each object having an original color defined by a plurality of color values:
      identifying a first subset of the objects that are substantially black or a tint of black;
      mapping the first subset of the objects to a first partition;
      calculating a luminance value for each unmapped object by calculating a weighted sum of the color values for each object;
      based on the luminance values, transforming the colors of the unmapped objects to a percent tint of a spot color by:
         assigning a maximum percent tint to the object with a lowest luminance value, and
         for each unmapped object, assigning the percent tint based on the quotient of the difference between the luminance value of the unmapped object and a maximum luminance value, and the difference between the lowest luminance value and the maximum luminance value; and mapping the transformed objects to a second partition.

22. A computer-readable medium having computer-executable instructions for performing the steps of:

receiving an image comprising a plurality of objects, each object having an original color defined by a plurality of color values:

identifying a first subset of the objects that are substantially black or a tint of black;

mapping the first subset of the objects to a first partition;

identifying a second subset of the objects that are substantially the same color as a first spot color or a tint of the first spot color;

mapping the second subset of objects to a second partition;

calculating a luminance value for each unmapped object by calculating a weighted sum of the color values for the object;

based on the luminance values, transforming the colors of the unmapped objects to a percent tint of a spot color by:

assigning a maximum percent tint to the object with a lowest luminance value, and for each unmapped object, assigning the percent tint based on the quotient of the difference between the luminance value of the unmapped object and a maximum luminance value, and the difference between the lowest luminance value and the maximum luminance value; and mapping the transformed objects to a third partition.

* * * * *